July 4, 1939.  A. C. HARDY  2,165,168
COLOR REPRODUCTION
Original Filed Jan. 21, 1937   2 Sheets-Sheet 2
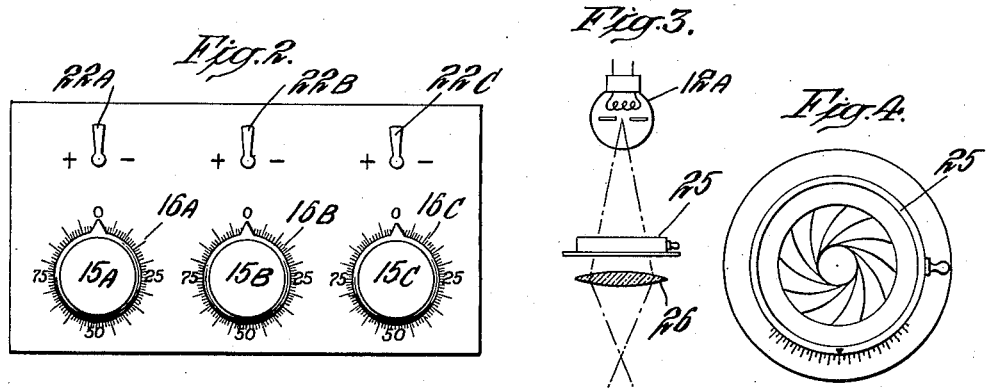
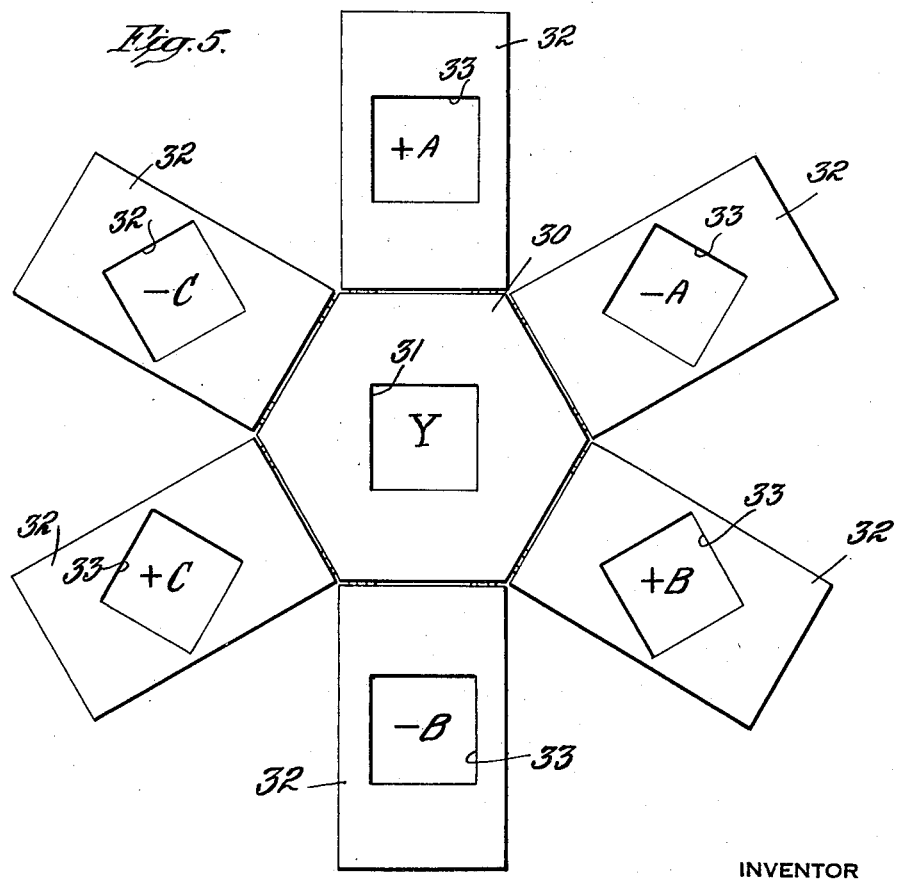
INVENTOR
Arthur C. Hardy
BY Robert W. Byerly
ATTORNEY Patented July 4, 1939

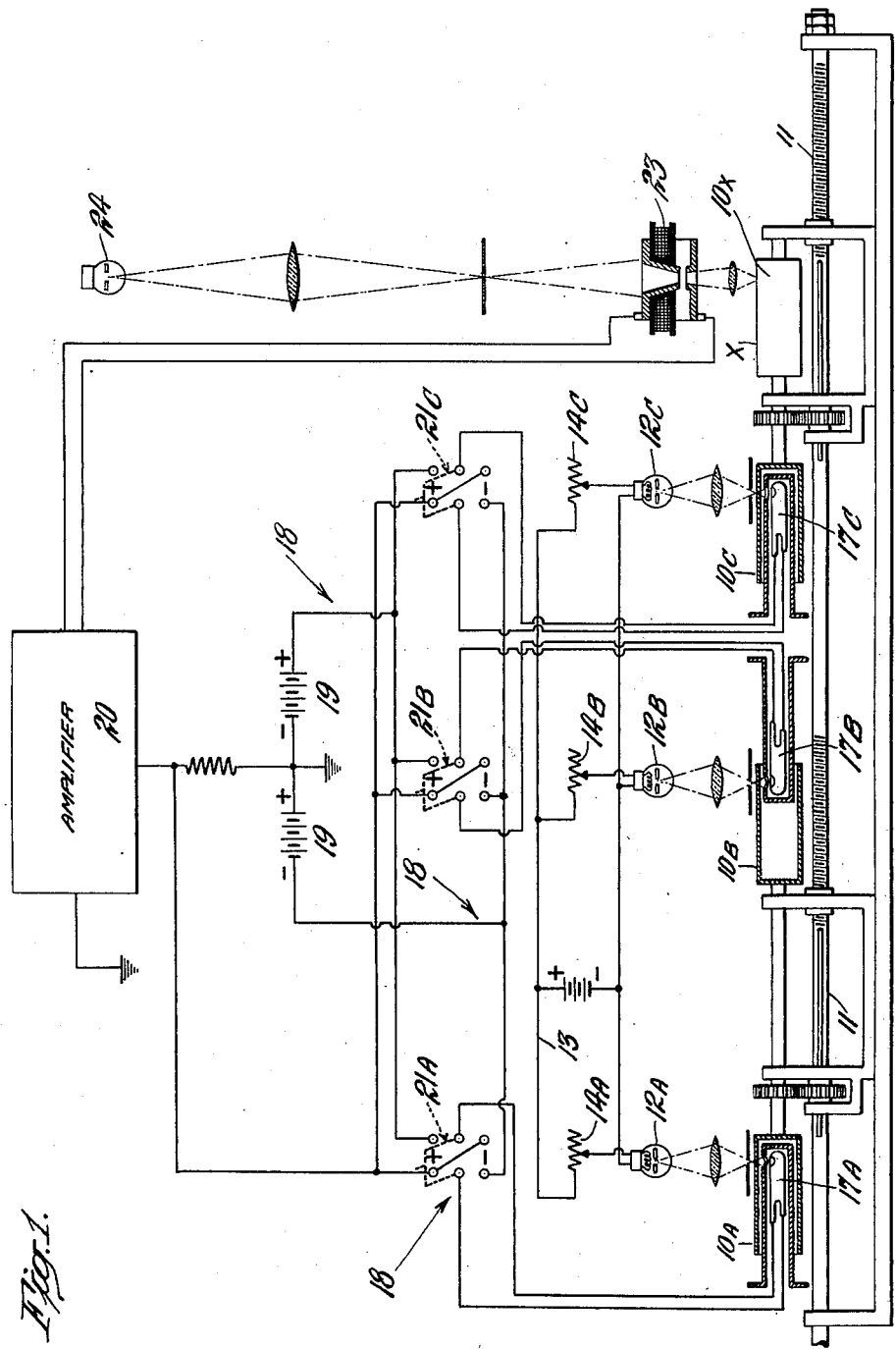

2,165,168

UNITED STATES PATENT OFFICE 2,165,168

COLOR REPRODUCTION

Arthur C. Hardy, Wellesley, Mass., assignor to Interchemical Corporation, a corporation of Ohio Application January 21, 1937, Serial No. 121,466
Renewed February 2, 1939

18 Claims. (Cl. 178—5.2)

This invention relates to color reproduction and especially to making correct color separation images.

As the terminology of colorimetry and color reproduction is not fixed, I will first define the sense in which various terms will be used in this application.

"Color" will be used in the abstract or optical sense and as so used should be understood to exclude pigments and other colored materials as well as the physiological sensation produced by color. A color has intensity and a spectral quality. The spectral quality of a color may be defined by its spectral energy distribution, that is, by the proportionate strength of radiations of different wave lengths which constitute the color. The spectral energy distribution of a color may be plotted as a curve whose abscissae represent different wave lengths and whose ordinates indicate the relative strengh of radiation at each wave length. The spectral quality of a color determines the stimulus required to produce the same color sensation. The stimulus may be defined by two factors, dominant wave length and purity, or by factors termed trichromatic coefficients.

The "primaries" of a color reproduction system are the colors of the colored lights which are mixed to give the observer a color sensation intended to duplicate the sensation which he would receive from colored light from the original subject.

A "color-separation image" is an image of the subject which is used to control one of the primaries in making a reproduction. It is a monochrome, usually black-and-white, image of a colored subject recording the effect of a spectral component of the light emitted by a colored subject, that is to say, it is a record of the part or component of the light emitted by the colored subject in some particular spectral region. In projection systems of color reproduction, the color-separation image may be a transparent positive which directly controls a colored light constituting one of the primaries. In systems of color reproduction used in the graphic arts, the color-separation images are formed upon or transferred to printing members, so that they control the primaries represented by the colored inks applied. Although color-separation images are not in themselves colored, they are frequently identified by the names of the colors of the primaries which they control. Thus the expression "red color-separation image" means a color-separation image to be used for controlling a primary whose dominant wave length is in the red part of the spectrum.

In my application Serial No. 99,415, filed September 4, 1936, I pointed out that accurate color reproduction required the making of three color separation images adapted to control the three specific primaries used in the reproduction system; and I there described a method by which such color separation images may be made for the control of any three specified primaries whose spectral qualities or trichromatic coefficients are known.

In my application Serial No. 99,416, filed September 4, 1936, I pointed out that the primaries of the subtractive color reproduction systems used in the graphic arts depend not only on the particular colored inks used but also on the way in which the colored inks are combined in the reproduction.

It is frequently desirable to have several sets of color separation images of the same subject to permit reproduction of the subject with different sets of primaries. In order to provide several sets of color separation images by the method described in my application Serial No. 99,415, it is necessary to prepare for each set of images photographic receptors whose spectral sensitivity is based on the spectral quality of the three primaries which the set of images is to control.

It is frequently convenient to photograph a subject for the purpose of making color separation images before the spectral qualities of the primaries to be used in the reproduction are known. This cannot be done by the method described in my application Serial No. 99,415, as that method involves determining the spectral sensitivities of the receptors to be used in photographing the subject in accordance with the spectral qualities of the primaries to be used in the reproduction.

I have now discovered that it is possible to use a set of correct color reproduction images adapted to control any set of primaries as a means for preparing a set of correct color reproduction images for controlling any other set of primaries. I have invented a method by which color separation images for controlling one set of primaries may be prepared from a set of images adapted to control a different set of primaries. This method eliminates the difficulties and inconveniences to which I have referred. After one set of correct color reproduction images of any subject has been prepared, for example, by the method described in my application Serial No. 99,415, my present method may be used, without again photographing the subject, to make additional sets of color reproduction images of the same subject for controlling other primaries.

For convenience in describing my method, I shall refer to the first set of color separation images as the "master images" and to the primaries which these images are adapted to control as the "master primaries". My method consists in making a set of color separation images adapted to control a specified set of reproduction primaries by making three different additive and subtractive combinations of the three master images in accordance with combining factors which depend upon the tri-stimulus values of the reproduction primaries referred to the master primaries. By an additive and subtractive combination of three master images I mean an image whose point-to-point variation in tone is directly proportional to the algebraic sum of constant fractions of the corresponding point-to-point variations in tone of the three master images. "Tone" as used in this definition is measured by transmittance when the images are transparencies and by reflectance when the images are not transparent.

In further explaining my method, I shall designate the three master images as A, B, C, and the master primaries which they are adapted to control as $P_A$, $P_B$, $P_C$. The three primaries to be used in the reproduction system, and for the control of which color separation images R, G and B are to be made, I shall designate as $P_r$ (the red primary), $P_g$ (the green primary), and $P_b$ (the blue primary). The tri-stimulus values of the red primary $P_r$, referred to the master primaries $P_A$, $P_B$, $P_C$, will be represented by $X_r$ $Y_r$, $Z_r$, and, in like manner, the tri-stimulus values of the green primary $P_g$ and the blue primary $P_b$, referred to the master primaries $P_A$, $P_B$, $P_C$, are represented by $X_g$, $Y_g$, $Z_g$ and $X_b$, $Y_b$, $Z_b$.

The combining factors $R_A$, $R_B$, $R_C$, indicating the combination of the three master images A, B and C which must be made to produce a correct color separation image R for controlling the primary $P_r$, are determined by the following equations:

$$R_A = Y_g Z_b - Y_b Z_g$$
$$R_B = X_b Z_g - X_g Z_b$$
$$R_C = X_g Y_b - X_b Y_g$$

The combining factors thus determined are quantities whose magnitudes indicate the relative extent to which each of the three master images contributes to the combination image and whose signs indicate whether each image is to be an additive or subtractive element in the combination.

The combining factors $G_A$, $G_B$, $G_C$ indicating the combination of the three master images A, B and C which must be made to produce a correct color separation image G for controlling the primary $P_g$, are determined by the following equations:

$$G_A = Y_b Z_r - Y_r Z_b$$
$$G_B = X_r Z_b - X_b Z_r$$
$$G_C = X_b Y_r - X_r Y_b$$

The combining factors $B_A$, $B_B$, $B_C$, indicating the combination of the three master images A, B and C which must be made to produce a correct color separation image B for controlling the primary $P_b$, are determined by the following equations:

$$B_A = Y_r Z_g - Y_g Z_r$$
$$B_B = X_g Z_r - X_r Z_g$$
$$B_C = X_r Y_g - X_g Y_r$$

My invention includes an electro-mechanical method of making combinations of the master images in accordance with the combining factors and an apparatus for carrying out this method, and also a photographic method of making the combinations and an apparatus for facilitating the practice of the photographic method. A detailed description of these will be given in connection with the accompanying drawings, in which:

Fig. 1 is a diagrammatic view showing an electro-mechanical scanning apparatus and its electrical connections;

Fig. 2 is an elevation of the control board of the apparatus shown in Fig. 1;

Figs. 3 and 4 show an adjustable diaphragm which may be used instead of the rheostats shown in Fig. 1 for controlling the effective intensity of the scanning lamps; and Fig. 5 is a front elevation of an apparatus for making photographic combinations of the master images.

The scanning apparatus shown in Figs. 1 and 2 includes four drums 10A, 10B, 10C and 10X, and driving apparatus 11 for giving each of the drums the same rotational and longitudinal movements. The drums 10A, 10B and 10C are transparent and are scanned by electric lights 12A, 12B and 12C connected in parallel in a circuit 13. Connected with the three lights are three rheostats 14A, 14B and 14C which control the intensities of the three lights. The three rheostats are operated by knobs 15A, 15B and 15C, having pointers which move over dials 16A, 16B and 16C on the instrument board of the apparatus shown in Fig. 2. Each dial is provided with graduations from one to one hundred, indicating the percentage of its maximum brightness at which each light burns at each setting of the knob operating its rheostat.

Within the drums 10A, 10B and 10C are photoelectric cells 17A, 17B and 17C. The three cells are connected in parallel in an electric circuit 18 containing a source of electro-motive force 19 and leading into an amplifier 20. The three photo-electric cells are connected into the circuit 18 through three reversing switches 21A, 21B and 21C, which may be set so as to oppose the current passing through any one photo-electric cell to that passing through the other two. The three reversing switches are operated by three levers 22A, 22B and 22C on the instrument board of the apparatus shown in Fig. 2. The symbols "+" and "—" are placed on the instrument board near each lever. When all three levers are turned to the "+" position, the currents through all three of the photo-electric cells 17A, 17B and 17C are passed through the circuit 18 in the same direction so that they are added. The movement of any one of the levers to the "—" position turns the reversing switch connected to the lever so as to oppose the current through the corresponding photo-electric cell to that through the other photo-electric cells in the circuit 18.

The output current from the amplifier 20 is passed through a light valve apparatus 23 so as to control the intensity of the light reaching the drum 10X from a lamp 24 of constant brightness.

In using the apparatus shown in Figs. 1 and 2 to carry out my method, the master images A, B and C (which may be either all positives or all negatives) are placed on the drums 10A, 10B and 10C, and an unexposed film X is placed on the drum 10X. To prepare the red separation image R, the knob 15A is set with its pointer on the figure corresponding to the magnitude of the combining factor $R_A$, and the lever 22a is set on the symbol corresponding to the sign of the combining factor $R_A$. The knobs 15b and 15c and the levers 22b and 22c are similarly set to correspond to the combining factors $R_B$ and $R_C$. The driving apparatus 11 is then operated to cause the lights to scan the four drums, with the result that there is impressed on the unexposed film X on the drum 10x an image which is an additive and subtractive combination or composite of the three images A, B and C, in which the relative extent to which each one of the images A, B and C affects the combination or composite image, corresponds to the relative magnitude of the combining factors $R_A$, $R_B$, $R_C$, and the effect of any image having a negative combining factor is subtracted from the effect of the images having positive combining factors.

To produce a color separation image G for controlling the green primary $P_g$, it is necessary only to place a new unexposed film on the drum 10x, to set the knobs 15a, 15b and 15c and the levers 22a, 22b and 22c to correspond to the magnitudes and the signs of the combining factors $G_A$, $G_B$ and $G_C$, and to operate the apparatus again. The third color separation image B, that for controlling the blue primary $P_b$, is made in a similar manner by setting the knobs 15a, 15b and 15c and the levers 22a, 22b and 22c to correspond to the magnitudes and the signs of the combining factors $B_A$, $B_B$ and $B_C$.

Figs. 3 and 4 show a modified means for controlling the effective intensity of the scanning lamps 12a, 12b, 12c, and consist of an adjustable diaphragm 25 which may be inserted between each scanning lamp and its condensing lens 26. When such diaphragms are used the rheostats 14a, 14b and 14c in the circuit 13 may be omitted and the adjustable diaphragms 25 may be set in accordance with the magnitude of the combining factors.

An alternate, but in some ways less desirable, way of carrying out my method is to make the combinations of the master images photographically. A convenient means for carrying out the method in this manner is shown in Fig. 5. It consists of an opaque hexagonal frame 30 containing a window 31 through which a photographic plate may be exposed. Hinged to the six sides of the frame 30 are six opaque flaps 32. Each flap may be folded over the frame 30. Each flap contains an opening 33 which fits over the window 31 in the frame when that flap is folded over the frame. In these six openings are mounted positives +A, +B, +C of the master images and negatives —A, —B, —C of the master images A, B, C.

In carrying out my method by means of this apparatus, a photographic plate Y having a linear response to radiant energy over a considerable range is placed in or behind the window 31. Three of the flaps 32 are then successively folded over the frame and three successive and preferably short exposures of the plate Y are made. In making the red color separation image R, either the flap containing the positive +A of the master image A or the flap containing the negative —A of the master image A is folded down according to whether the sign of the combining factor $R_A$ is plus or minus. After an exposure of the plate has been made through either the positive or negative of the master image A, the flap containing this positive or negative is folded out and one of the flaps containing the positive +B or the negative —B of the master image B is folded over the frame, according to whether the combining factor $R_B$ is plus or minus, and another exposure of the plate is then made. This flap is then folded up and one of the flaps containing the positive +C or the negative —C of the master image C is folded down, according to whether the combining factor $R_C$ is plus or minus, and a third exposure is made. The relative lengths of the three exposures are proportional to the magnitudes of the combining factors $R_A$, $R_B$, $R_C$, and each exposure is most desirably made rather short in order that the response of the plate may be as nearly as possible linear.

The plate Y is then removed and other plates are substituted, and the separation images G and B for controlling the primaries $P_g$ and $P_b$ are then made in a similar manner in accordance with the combining factors $G_A$, $G_B$, $G_C$, and $B_A$, $B_B$ and $B_C$.

In carrying out my method, it is not necessary that the master images be adapted for the control of any actual reproduction primaries. As pointed out in my application Serial No. 99,415, the making of a set of color separation images for the control of real primary colors requires the use of receptors whose spectral sensitivities contain negative values or of a method for producing images equivalent to those which would be made by such receptors. This is not the case in preparing a set of color separation negatives to control certain sets of imaginary primaries such, for example, as the primaries of reference used in the standard observer data published by the International Commission on Illumination. Color separation negatives for controlling these imaginary primaries may be made by means of receptors whose spectral sensitivities have only positive values.

Such color separation images adapted to control the set of imaginary primaries used in the data of the International Commission on Illumination or similar imaginary primaries, mixtures of which in positive amounts reproduce the stimuli of all colors of the spectrum, may easily be made by photographing a subject on the three receptors, the spectral sensitivity of each of which is positive throughout the spectrum. Such sets of color separation images, although easily made, have heretofore been of no value as they are not adapted to control any real primaries such as must be used in a reproduction system. They may, however, be used as the master images in the method of my present invention and thus serve as a means for making sets of color separation images for any specified set of real primaries to be used in a reproduction system. An important advantage of my invention lies in the fact that it makes possible the use of an easily made set of color separation images adapted to control imaginary primaries to make other sets of color separation images adapted to control the real primaries of any color reproduction system.

What I claim is:

1. The method of making color-separation images for color reproduction, which consists in first making three master images adapted to control a set of three primaries, and then making three different additive and subtractive combinations of the three master images to produce three color-separation images adapted to control a set of three different primaries.

2. The method of making color-separation images for color reproduction, which comprises first making three master images adapted to control three master primaries, and then making three color-separation images to control a set of three reproduction primaries different from said master primaries by making three different additive and subtractive combinations of the three master images in accordance with combining factors determined by the tri-stimulus values of the three reproduction primaries referred to the three master primaries.

3. The method of making a color-separation image by means of a plurality of master color-separation images, which consists in making a composite image from the master images in which the effect of light controlled by some of said master images is subtracted from the sum of the effects of light through the other master images.

4. The method of making a color-separation image by means of a plurality of master color-separation images, which consists of making a plurality of independent, registering exposures on a photographic plate, one of said exposures being through a positive of one of the master images, another of said exposures being through a negative of another of the master images, and each other exposure being through one other of the master images, so that the composite image made on the photographic plate records the sum of the effects of light controlled by some of the master images less the effect of light controlled by the others of the master images.

5. The method of making a color-separation image by combining three master images in accordance with predetermined positive and negative combining factors, which consists in making independent, registering exposures of a photographic plate through the three master images, using positives of the master images whose combining factors are positive and negatives of the master images whose combining factors are negative, and making the relative lengths of the exposures such that the relative chemical effects of the exposures are proportional to the magnitudes of the combining factors.

6. A method of making a color-separation image from a plurality of master images, which comprises simultaneously modulating a separate electric current in accordance with the point-to-point variation in the transparency of each separate master image, combining said electric currents so as to provide a resultant current which at any moment is proportional to the difference between some of said currents and the sum of the others of said currents, and utilizing the resultant current to control a recording device, so as to produce a composite image of the master images in which light controlled by some of the master images has had an effect opposite from that of light controlled by others of the master images.

7. A method of making a color-separation image by combining three master images in accordance with predetermined negative and positive combining factors, which comprises simultaneously modulating three electric currents in accordance with the corresponding point-to-point variations in the transparency of the three master images, making the strength of the current modulated by each image correspond to the magnitude of the combining factor for that image, combining said three currents to produce a resultant current proportional to the algebraic sum of the currents modulated by the three images, while making the direction of the current modulated by each master image correspond to the sign of the combining factor for that image, and utilizing the resultant current to control a recording device.

8. A method of making a color-separation image by combining three master images in accordance with predetermined negative and positive combining factors, which comprises simultaneously scanning the three master images with three lights the relative strengths of which correspond to the relative magnitude of the combining factors while receiving the light passed through the images on three photo-electric cells to modulate electric currents passed therethrough, combining said three currents to produce a resultant current proportional to the algebraic sum of the current modulated by the three images while making the direction of the current modulated by each master image correspond to the sign of the combining figure for that image, and utilizing the resultant current to control a recording device.

9. An electromagnetic scanning apparatus for making a composite of a plurality of master images, comprising means for causing corresponding movement of a plurality of master images and a recording plate, a plurality of lamps one of which is in position to scan each master image in such movement, a plurality of photo-electric cells one of which is positioned to receive the light passed through each master image to modulate an electric current, an interconnection between said cells arranged to produce a resultant current proportional to the difference between the currents through the cells, and a recording device controlled by said resultant current and positioned to make a record on said recording plate.

10. An electromagnetic scanning apparatus for making a composite of a plurality of master images, comprising means for causing corresponding movement of a plurality of master images and a recording plate, a plurality of lamps one of which is in position to scan each master image in such movement, a plurality of photo-electric cells one of which is positioned to receive the light passed through each master image to modulate an electric current, an interconnection between said cells arranged to produce a resultant current proportional to the algebraic sum of the separate currents through the cells, at least one of said currents being regarded as negative, and a recording device controlled by said resultant current positioned to make a record on said recording plate.

11. An electromechanical scanning apparatus for making a composite image from three master images, comprising means for causing corresponding movement of the three master images and a recording plate, three lamps one of which is positioned to scan each master image in such movement, three photo-electric cells one of which is positioned to receive light passed through each master image to modulate an electric current, an interconnection between said cells arranged to produce a resultant current proportional to the difference between the sum of the currents through two of the cells and the current through the third cell, and a recording device controlled by said resultant current and positioned to make a record on said recording plate.

12. An electromagnetic scanning apparatus for making a composite of a plurality of master images, comprising means for causing corresponding movement of a plurality of master images and a recording plate, a plurality of lamps one of which is in position to scan each master image in such movement, a plurality of photo-electric cells one of which is positioned to receive the light passed through each master image to modulate an electric current, an interconnecting circuit between said cells arranged to produce a resultant current proportional to the algebraic sum of the separate currents through the cells, and a reversing switch interposed between each cell and said interconnecting circuit to permit reversal of the current through any of the cells, and a recording device controlled by said resultant current and positioned to make a record on said recording plate.

13. An electromechanical scanning apparatus for making a composite image from a plurality of master images, comprising means for causing corresponding movement of the master images and a recording plate, a plurality of lamps one of which is in position to scan each master image in such movement, a plurality of photoelectric cells one of which is positioned to receive the light passed through each master image to modulate an electric current, means for regulating the relative strengths of the currents passed through the separate photocells, an interconnection between the cells arranged to produce a resultant current proportional to the algebraic sum of the separate currents through the cells, and a recording device controlled by said resultant current and positioned to make a record on said recording plate.

14. An electromechanical scanning apparatus for making a composite image from a plurality of master images, comprising means to cause corresponding movement of the master images and a recording plate, a plurality of lamps one of which is in position to scan each master image in such movement, means for regulating the relative strength of said lamps, three photo-electric cells one of which is positioned to receive the light passed through each master image through its scanning lamp to modulate an electric current, an interconnection between said cells arranged to produce a resultant current proportional to the algebraic sum of the separate currents through the cells, and a recording device controlled by said resultant current in position to make a record on the recording plate.

15. An electromechanical scanning apparatus for making a composite image from a plurality of master images, comprising means for causing corresponding movement of the master images and a recording plate, a plurality of lamps one of which is positioned to scan each master image in such movement, means for regulating the relative strength of said lamps, means for indicating the relative strength of said lamps, a plurality of photo-electric cells one of which is positioned to receive the light passed through each master image from its scanning lamp to modulate an electric current through the cell, an interconnecting circuit between said cells arranged to produce a resultant current proportional to the algebraic sum of the separate currents through the cells, a reversing switch interposed between each cell and said circuit, and a recording device controlled by said resultant current and positioned to make a record on said recording plate.

16. The method of making color separation images for color reproduction, which consists in first making three master images adapted to control three imaginary primary colors, and then making three different additive and subtractive combinations of the three master images to produce color separation images adapted to control three real primary colors.

17. The method of making color separation images for color reproduction, which comprises first making three master images adapted to control three imaginary primary colors so selected that positive amounts of each of them may be mixed to produce all visible color sensations, and then making three color separation images to control the primaries of the reproduction system by three different additive and subtractive combinations of the three master images in accordance with combining factors determined by the tri-simulus values of the three reproduction primaries referred to the aforesaid three imaginary colors.

18. The method of making a set of color-separation images for a color reproduction to be made with specified primaries, which comprises making three different additive and substractive combinations of three master color-separation images in accordance with predetermined positive and negative combining factors.

ARTHUR C. HARDY.